United States Patent
Bjarnason et al.

(10) Patent No.: US 8,315,215 B2
(45) Date of Patent: Nov. 20, 2012

(54) INTELLIGENT SECTOR CHANNEL ALLOCATION

(75) Inventors: Elias Bjarnason, Grasbrunn (DE); Thomas Zettler, Hoehenkirchen-Siegertsbrunn (DE); Stefan Kluwe, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1191 days.

(21) Appl. No.: 12/048,093

(22) Filed: Mar. 13, 2008

(65) Prior Publication Data

US 2009/0233617 A1    Sep. 17, 2009

(51) Int. Cl.
*H04W 4/00* (2009.01)
*H04W 72/00* (2009.01)
*H04W 24/00* (2009.01)

(52) U.S. Cl. .............. 370/329; 455/450; 455/456.5; 455/456.6; 370/341

(58) Field of Classification Search .......... 455/450–453, 455/403, 422.1, 455, 456.5, 456.6
See application file for complete search history.

(56) References Cited

U.S. PATENT DOCUMENTS

| | | | | |
|---|---|---|---|---|
| 5,475,868 A * | 12/1995 | Duque-Anton et al. | ......... | 455/62 |
| 5,586,338 A * | 12/1996 | Lynch et al. | .................. | 455/433 |
| 5,832,384 A * | 11/1998 | Balachandran et al. | ...... | 455/450 |
| 6,052,594 A * | 4/2000 | Chuang et al. | ................ | 455/450 |
| 6,108,321 A * | 8/2000 | Anderson et al. | ............ | 370/329 |
| 6,185,423 B1 * | 2/2001 | Brown et al. | ................. | 455/434 |
| 6,304,756 B1 * | 10/2001 | Hebeler et al. | ................ | 455/450 |
| 6,973,059 B1 * | 12/2005 | Borst et al. | ...................... | 370/330 |
| 2003/0087643 A1 * | 5/2003 | Mazzara | ...................... | 455/450 |
| 2007/0099562 A1 * | 5/2007 | Karabinis et al. | ............ | 455/12.1 |
| 2009/0097493 A1 * | 4/2009 | Patil et al. | ..................... | 370/412 |

* cited by examiner

*Primary Examiner* — Wayne Cai
*Assistant Examiner* — Huy C Ho
(74) *Attorney, Agent, or Firm* — Slater & Matsil, L.L.P.

(57) ABSTRACT

Allocation of a plurality of channels in a wireless network is described. The allocation process has each base station serving the sectors in the network scan each unused channel of the plurality of channels in its served sector. The signal quality of each scanned, unused channel is measured and sorted according to the measured signal quality. The quality-sorted unused channels are then ordered according to a statistical algorithm. An ordered list of available channels is generated according to results of the statistical algorithm ordering. This ordered list is broadcast to each access terminal (AT) registered with the base station. New communication between the base station and its registered ATs is then initiated using one of the unused channels in the ordered list.

19 Claims, 4 Drawing Sheets

INTELLIGENT SECTOR CHANNEL ALLOCATION

TECHNICAL FIELD

The present invention relates, in general, to wireless networks and, more particularly, to intelligent channel allocation within a network sector or cell.

BACKGROUND

Because the usable frequency spectrum is finite, modern wireless communication networks began as viable public communication means with the adoption of frequency reuse schemes. In a typical "cellular" communication network, many low-powered "cells" provide radio communication to access terminals (ATs) within the cell's limited range. Each cell generally has a certain number of radio channels allocated for its use. Each neighboring cell may also have a certain number of radio channels allocated for their use. The early frequency reuse schemes provided that the frequency of channels used in a first cell could be reused in another cell as long as that other cell was far enough away from the range of the first cell to avoid channel interference. As ATs crossed into new cells there was a complicated hand-off that occurred where the communication session was changed from the original channel to a new channel provided in the new cell.

In modern wireless communication systems, coding and other sophisticated signal processing techniques allow some frequencies to be reused in neighboring cells or sectors. Moreover, modern networks typically use fixed channel assignment (FCA), in which each sector allocates channels to the ATs within the sector. Thus, there may be occasion in which two neighboring sectors assign the same channel to two different ATs. This can be a problem if the two ATs are close enough to experience same channel interference from the other AT's communication session. It may also be a problem during handoff when an incoming AT is on the same channel as an AT already in the sector. This sector-centered system may result in channel collisions between cells, slower detection by the access node (AN) of a call request from an AT, and delayed paging from the AN to the AT. Collisions and call delay often lead to customer dissatisfaction which could eventually lead to lower revenues for the service provider.

SUMMARY OF THE INVENTION

These and other problems are generally solved or circumvented, and technical advantages are generally achieved, by preferred embodiments of the present invention which allocate a plurality of channels in a wireless network. The allocation process has each base station serving the sectors in the network scan each unused channel of the plurality of channels in its served sector. The signal quality of each scanned, unused channel is measured and sorted according to the measured signal quality. The quality-sorted unused channels are then ordered according to a statistical algorithm. An ordered list of available channels is generated according to results of the statistical algorithm ordering. This ordered list is broadcast to each AT registered with the base station. New communication between the base station and its registered ATs is then initiated using one of the unused channels in the ordered list.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a time division multiple access (TDMA) wireless network. The invention may also be applied, however, to other types of wireless networks.

Figure 1A:
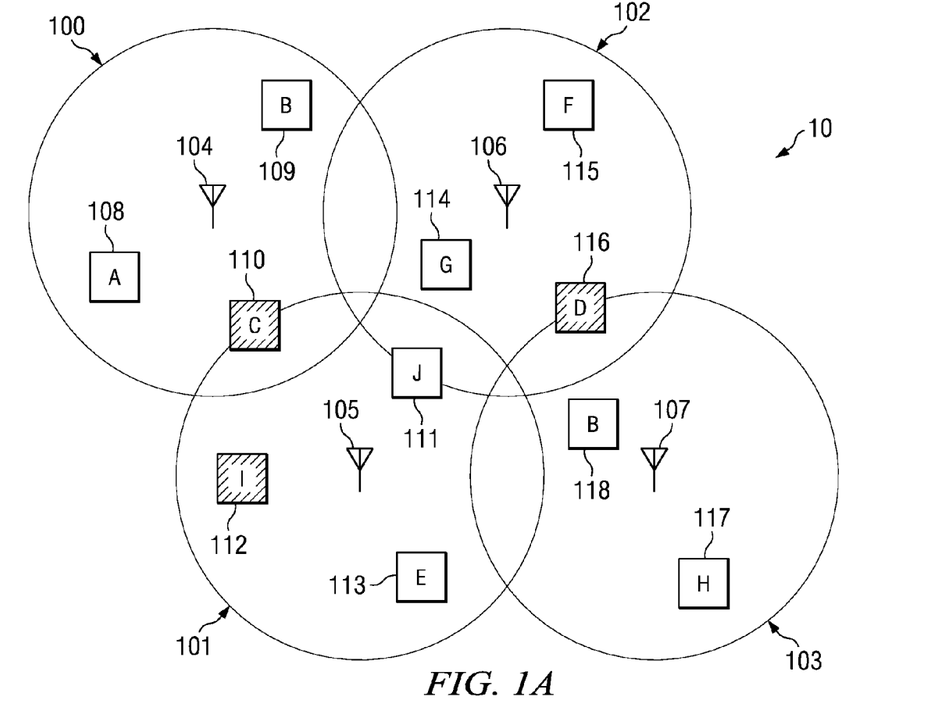
FIG. 1A is a diagram illustrating cells in a network configured according to one embodiment of the present invention.

With reference now to FIG. 1A, cells 100-103 are shown in network 10 configured according to one embodiment of the present invention. Ten channels, A-J, are available to each of cells 100-103 for assignment to various mobile devices for communication. At a first time, t1, cell 100 is serving mobile devices 108 and 109 from base transceiver station (BTS) 104 on channels A and B, respectively. Mobile device 110 is registered with BTS 104, but is not in operation at t1. Cell 101 is serving mobile devices 111 and 113 from BTS 105 on channels J and E, respectively. Mobile device 112 is registered with BTS 105, but is not in operation at t1. Cell 102 is serving mobile devices 114 and 115 from BTS 106 on channels G and F, respectively. Mobile device 116 is registered with BTS 106 within cell 102, but is not in operation at t1. And, cell 103 is serving mobile devices 117 and 118 from BTS 107 on channels H and B, respectively.

During operation at t1, BTS 104 scans all of the channels not currently in use in cell 100. In scanning the unused channels, BTS 104 sorts the unused channels according to the signal quality. BTS 104 may perform this sorting by comparing the signal-to-noise (S/N) ratio measured for each of the unused channels, or it may use the received signal strength indicators (RSSIs). After performing a first sort according to signal quality, BTS 104 sorts again using a network preset statistical algorithm. Examples of such a statistical algorithm may be least recently used (LRU), lease frequently used (LFU), adaptive replacement, which constantly balances between LRU and LFU, or the like. For purposes of this example embodiment in FIG. 1A, network 10 has set the statistical algorithm for the various base stations to use as an LFU algorithm, which sorts according to the channel that has historically (i.e., over a sampling period) been used least frequently.

BTS 104, therefore, sorts the quality-sorted unused channels again according to the LFU algorithm. Thus, when the currently measured or detected signal quality is the same between channels, BTS 104 will rank the channel that has been used less often than the other channel currently having the same or similar signal quality. This intelligent list is then broadcast to each mobile device that has registered with BTS 104 within cell 100.

Figure 1B:
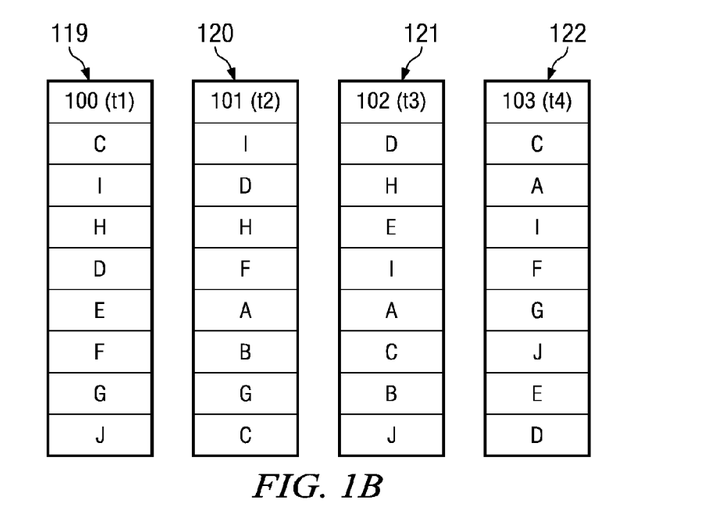
FIG. 1B is a diagram illustrating intelligent lists corresponding to the BTSs in a network configured according to one embodiment of the present invention.

FIG. 1B is a diagram illustrating intelligent lists 119-122 corresponding to BTSs 104-107 in network 10 configured according to one embodiment of the present invention. Intelligent list 119 represents the list generated by BTS 104 at time t1, intelligent list 120 represents the list generated by BTS 105 at time t2, intelligent list 121 represents the list generated by BTS 106 at time t3, and intelligent list 122 represents the list generated by BTS 107 at time t4.

Turning back again to FIG. 1A, BTS 104 places the two least frequently used channels at the top of intelligent list 119 (FIG. 1B) sorted according to signal quality, C and I. Channels H and D, next in intelligent list 119 (FIG. 1B), respectively, are also lower on the use frequency scale. Moreover, BTS 104 receives little or no interference from mobile unit 117 in cell 103, which is also communicating over channel H. The remaining channels in intelligent list 119 (FIG. 1B), E, F, G, and J, have been ranked lower because of the lower signal quality measured by BTS 104 due to the close proximity of mobile devices 113, 115, 114, and 111, which are communicating over channels E, F, G, and J, respectively in cells 101 and 102. Within that ordering, E and F have less interference measured in the signal quality by BTS 104, but E is placed higher in the order than F because it is less frequently used than F. Similarly, G and J, which have the most interference measured in the signal quality by BTS 104 are placed with G higher in the order, again, because it is less frequently used than J.

At time t1+, just after t1, mobile device 110 becomes active and establishes a communication session through BTS 104. Because mobile device 110 has received intelligent list 119 (FIG. 1B), having been registered with BTS 104, communication is initiated between mobile device 110 and BTS 104 using channel C. Because this is the known first available channel in cell 100, the call request by mobile device 110 is detected more quickly by BTS 104. Moreover, because intelligent list 119 (FIG. 1B) has been generated taking into account the deployment of channels in neighboring cells 101 and 102, there is a high probability that there will be no channel collision between the channels allocated in cells 101 and 102. This effectively orthogonalizes the channel allocation in cell 100.

At time t2, after mobile device 110 has initiated communication over channel C, each of cells 100-103 re-scan the unused channels and re-compiles the intelligent lists. Intelligent list 120 (FIG. 1B) is the list generated by BTS 105 for cell 101 at time t2. Because of its proximity to BTS 105, mobile device 110 operating within cell 100 causes a great deal of interference as detected by BTS 105 when measuring the signal quality. Thus, channel C, even though it is a less frequently used channel, now brings up the bottom of intelligent list 120 (FIG. 1B). The next least frequently used channel which shows the highest signal quality, channel I, is placed at the top of intelligent list 120 (FIG. 1B). The remaining ordering, D, H, F, A, B, and G, reflect the two level sorting of signal quality and use frequency.

A communication stream is received at BTS 105 at time t2+, just after t2, addressed to mobile device 112, which is registered with BTS 105, but not currently operational. BTS 105 transmits a page addressed to mobile device 112 over channel I, the next best available channel for cell 101 on intelligent list 120 (FIG. 1B). Again, similar to before, because both BTS 105 and mobile device 112 have the current intelligent list, intelligent list 120 (FIG. 1B), mobile device 112 recognizes the page much more quickly and the communication session may be established more quickly with the incoming communication stream.

At time t3, after mobile device 112 has initiated communication over channel I, each of cells 100-103 re-scan the unused channels and re-compiles the intelligent lists. Intelligent list 121 (FIG. 1B) is the list generated by BTS 106 for cell 102 at time t3. Because of their proximity to BTS 106, mobile devices 111, 118, and 110, operating within cells 100, 101, and 103, cause a measurable increase in interference as detected by BTS 106 when measuring the signal quality. Thus, channels C, B, and J are the lowest desirable channels on intelligent list 121 (FIG. 1B). The top two channels of intelligent list 121 (FIG. 1B), D and H, have the same ordering as intelligent list 120 (FIG. 1B), but are switched in order from intelligent list 119 (FIG. 1B). While channel H is used relatively less frequently than channel D in general, the interference from mobile device 117 in cell 103 affected the signal quality determined by BTSs 105 and 106 in the first pre-sort. Thus, intelligent lists 120 and 121 (FIG. 1B) each reflected this lower signal quality by ordering channel D above channel H in intelligent list 120 (FIG. 1B). The remaining channels in the middle of intelligent list 120 (FIG. 1B), channels E, I, and A, are ordered as described above with regard to intelligent lists 119 and 120.

At time t3+, just after t3, mobile device 116 transmits a call request to BTS 106 using channel D, the top channel on intelligent list 121 (FIG. 1B), which it had received from BTS 106 as a registered device within cell 102. Again, BTS 106 is more quickly able to detect the call request on channel D and establish the call communication. Because intelligent list 121 (FIG. 1B) reflects the deployment pattern of neighboring cells 101 and 102, along with any possible environmental interferences, the chances for experiencing a channel collision with a neighboring mobile device is lower. Moreover, the chances of experiencing service quality interruptions or diminishment because of environment interference is also lessened.

Intelligent list 122 (FIG. 1B) represents the list generated by BTS 107 at time t4. As each successive list is generated by BTS 107, at times before t4, different channels may have been placed on top of the list. However, because of neighboring cell allocations and any possible surrounding environmental interference, those channels may have been placed further down on the list. Channel C is listed at the top of intelligent list 122. Channel C had also been listed at the top of intelligent list 119 at t1. Because Channel C had been found to be a least frequently used channel, its placement has been made higher because of its lack of use. However, as time progresses beyond t4, as Channel C is placed higher in more lists and used more frequently, its weighting factor of least frequent use will begin to diminish, thus, placing it further down any these intelligent lists as a more frequently used channel. Thus, the organization and ordering of the lists self-correct to ensure that the cells within network 10 remain effectively orthogonalized.

It should be noted that numerous types of statistical algorithms may be used by the various embodiments of the present invention. Use-based algorithms may produce a more orthogonal-like result, however, power or quality-based algorithms may also be used if power consumption or the like is a higher concern. Additionally, the selection of statistical algorithm to use may be made individually by each cell, instead of assigned network-wide by a network administrator. Alternatively, a network administrator may provide several possible algorithms that could be used in various situations, in which the individual cell would weigh the particular situation it was experiencing and select the statistical algorithm accordingly.

Figure 2:
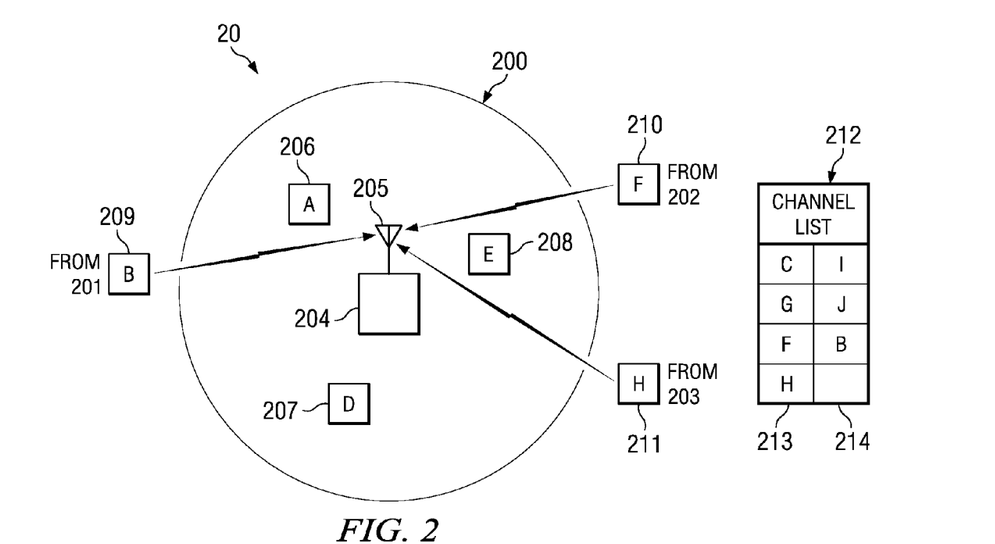
FIG. 2 is a diagram illustrating a sector of a network configured according to one embodiment of the present invention.

FIG. 2 is a diagram illustrating sector 200 of network 20 configured according to one embodiment of the present invention. At the time instant reflected in FIG. 2, sector 200 is serving ATs 206-208 on channels A, D, and E, respectively, through base station 204 and antenna array 205. Base station 204 scans each of the currently unused channels in sector 200 and sorts them according to signal quality. With channels A-J available to sector 200, channels B, C, F, G, H, I, and J are each currently unused. Base station 204 determines the signal quality by measuring the S/N ratio of each available/unused channel. For channels C, G, I, and J, base station 204 measures a high S/N ratio and orders those channels according to their high quality. However, base station 204 detects a lower S/N ratio on channel B due to channel B's use by AT 209 in neighboring sector 201. Similarly, base station 204 detects a lower S/N ratio on channel F due to channel F's use by AT 210 in neighboring sector 202. Base station 204 also detects a lower S/N ratio on channel H, but the signal interference that is detected by base station 204 is actually being generated by environmental disturbance 211 in location 203. Environment disturbance 211, which comes from an environmentally occurring signal source, may be any kind of disturbance that would generate a signal within the frequency of channel H, such as a power generation plant, an industrial facility, a mountain, a valley wall, a forest, or the like.

In creating channel list 212, base station 204 sorts the quality-sorted list of unused channels again by a statistical algorithm. For purposes of FIG. 2, the statistical algorithm is a LRU calculation. Therefore, where signal strength or quality is similar, the channels will be sorted again according to which channel has been used less recently than the others. Additionally, network 20 has provided channel deployment rules that will be used by base station 204 to allocate the best-available channels for various purposes. For example, network 20 has provided that the first preferred channels are to be allocated for traffic bearer channels for each handset. Network 20 has further provided that the second preferred channels are to be allocated for dummy bearer transmission. Dummy bearers are transmitted for ATs that are in an active idle state, meaning that the AT has registered with the base station, is on, but is not currently part of an active communication session. As created by base station 204, channel list 212 includes traffic channel list 213 comprising channels C, G, F, and H, and dummy bearer channel list 214 comprising channels I, J, and B.

This further organization of the best available channels in sector 200 will further increase the speed with which base station 204 can detect call requests and provide paging. Because base station 204 and each of the ATs registered with base station 204 knows that channels C, G, F, and H are for use as traffic channels for call request start up, and knows that channels I, J, and B are for use with dummy bearer signaling, the detection of which channel is being received, by either base station 204 or any of the registered ATs within sector 200, informs the receiver what type of message is being received. This "pre-knowledge" allows for the faster processing of such signals. Moreover, as before, because channel list 212 is created taking into account not only the channel deployment patter in neighboring sectors, such as sectors 201 and 202, it also takes into account any environmental interference, such as environmental disturbance 211 from location 203. Thus, communication quality is improved and the possibility of channel collision between sectors, and therefore the need for implementing complex handover processes, is diminished.

Figure 3:
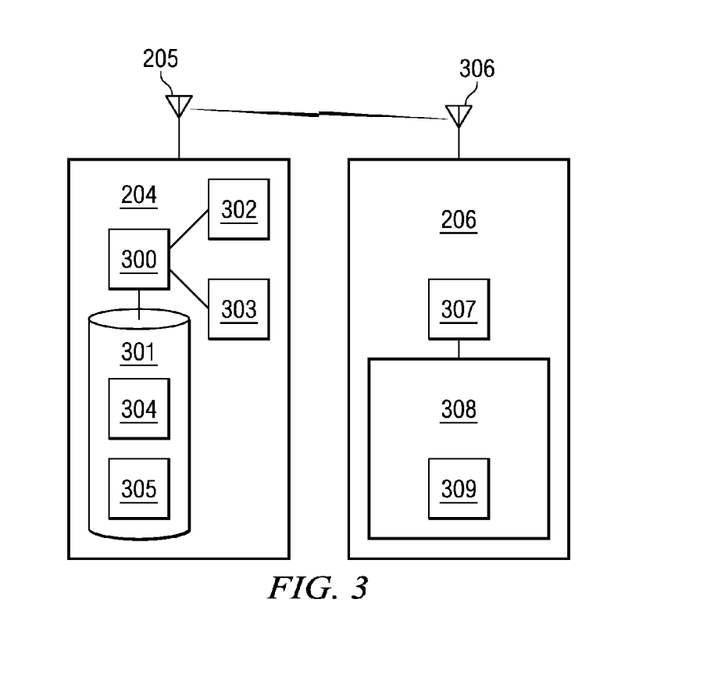
FIG. 3 is a partial detail illustrating a base station and AT configured according to one embodiment of the present invention.

FIG. 3 is a partial detail illustrating base station 204 and AT 206 configured according to one embodiment of the present invention. Base station 204 comprises processor 300, memory 301, signal detector 302, signal comparator 303, and antenna array 205. When scanning the unused channels, base station 204 receives those channels over antenna array 205 which are then detected by signal detector 302 under operation of processor 300. Signal detector 302 and signal comparator 303, both under control of processor 300, work in concert to measure the signal quality of each unused signal and sort the unused signals according thereto. Once sorted according to signal quality, processor 300 accesses memory 301 for statistical algorithm 304. Statistical algorithm 304 has been stored in memory 301 after assignment by the network. Using statistical algorithm 304, processor 300 again executes signal comparator 303 to sort the quality-sorted list of channels according to the specifics of statistical algorithm 304. The resulting list after the second sort is then stored as intelligent list 305 in memory 301. Thereafter, a copy of intelligent list 305 is broadcast over antenna array 205 to each AT registered with base station 204, including AT 206.

AT 206 comprises antenna array 306, processor 307, and memory 308. When intelligent list 305 is broadcast in the cell, AT 206 stores it as intelligent list 309 within memory 308. When AT 206 needs to initiate a call request to base station 204, processor 307 accesses memory 308 for intelligent list 309. Processor 307 determines takes the top channel on the list for call startup and transmits the request using that channel over antenna array 306. Base station 204 receives the call request of the particular channel from AT 206, signal detector 302, under control of processor 300, detects which channel the call request has arrived on. Based on that information, compared against intelligent list 305 in memory 301, base station 204 knows that AT 206 is requesting a call. This detection process is much faster because base station 204 knows what type of signal is associated with detected channel.

Similarly, when base station 204 needs to page AT 206, it accesses intelligent list 305 to determine the top channel available for a paging channel or dummy bearer. Base station 204 then transmits the page over antenna array 205 using this channel. Upon receipt of the signal on the selected channel, AT 206 compares the received channel against intelligent list 309 in memory 308 and determines that it is being paged by base station 204. Again, this detection process produces results more quickly because AT 206 has the information in intelligent list 309 that indicates what type of signal is arriving on the particular channel.

Figure 4:
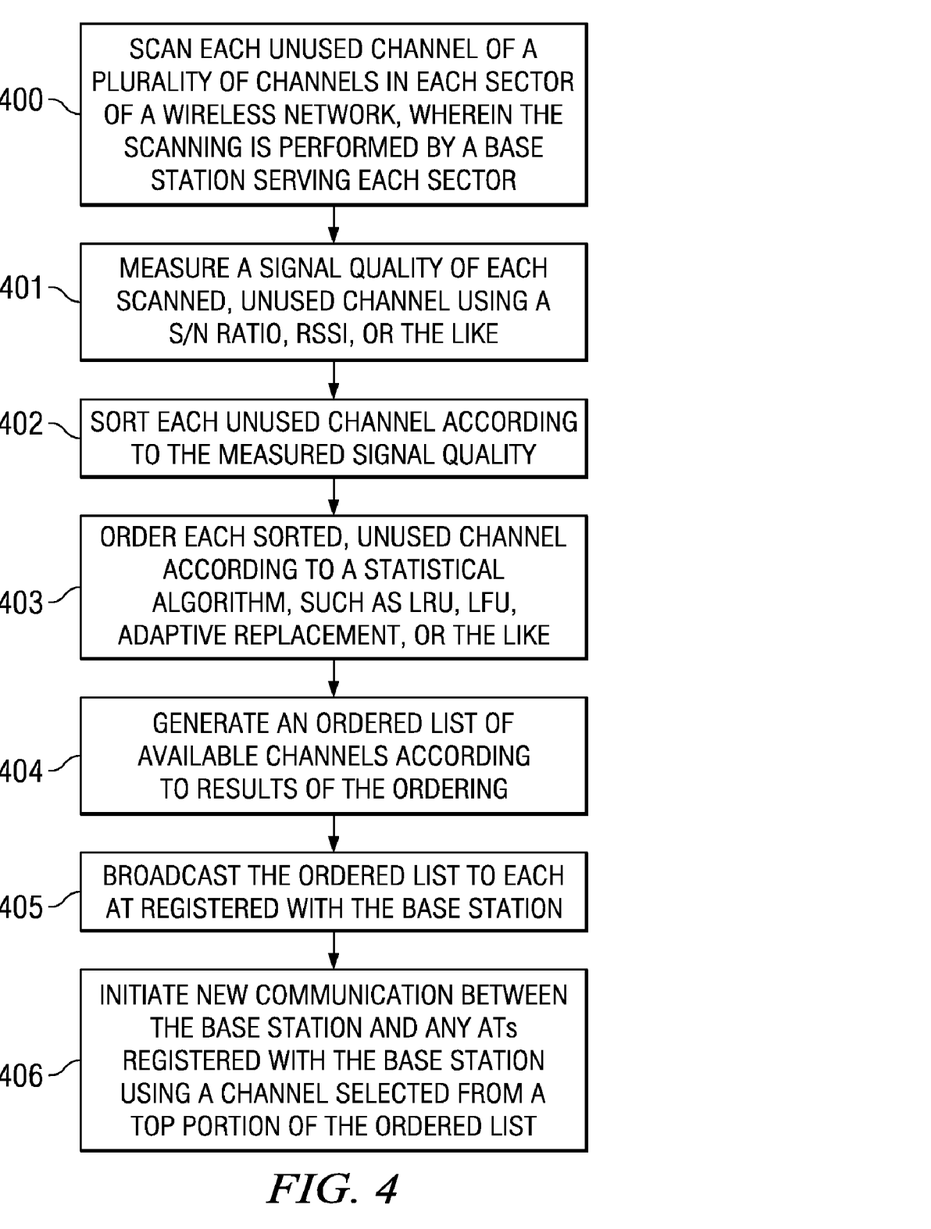
FIG. 4 is a flowchart illustrating example steps executed to implement one embodiment of the present invention.

FIG. 4 is a flowchart illustrating example steps executed to implement one embodiment of the present invention. In step 400, each unused channel of a plurality of channels in each sector of a wireless network is scanned, wherein the scanning is performed by a base station serving each sector. A signal quality of each scanned, unused channel is measured, in step 401, using a S/N ratio, RSSI, or the like. Each unused channel is sorted, in step 402, according to the measured signal quality. The sorted, unused channels are then ordered, in step 403, according to a statistical algorithm, such as LRU, LFU, adaptive replacement, or the like. In step 404, an ordered list of available channels is generated according to results of the ordering. The ordered list is broadcast to each AT registered with the base station in step 405. New communication is initiated, in step 406, between the base station and any ATs registered with the base station using a channel selected from a top portion of the ordered list.

It should be noted that various additional and/or alternative embodiments of the present invention may provide additional intelligent selection by provisioning an ordered intelligent list to be generated and maintained on the handsets or mobile devices as well.

Figure 5:
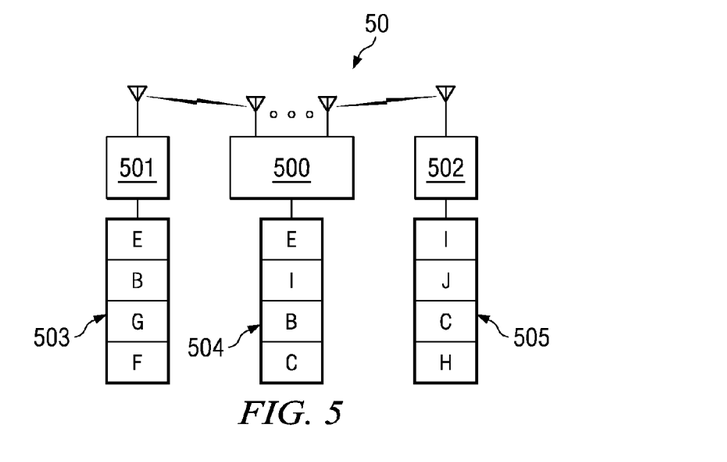
FIG. 5 is a block diagram illustrating a network configured according to one embodiment of the present invention.

FIG. 5 is a block diagram illustrating network 50 configured according to one embodiment of the present invention. In the portion of network 50 illustrated, base station 500 services both handset 501 and 502. Base station 500 compiles intelligent list 504 according to the steps and procedures as outlined above. However, each of handsets 501 and 502 also compile their own intelligent lists 503 and 505 using a statistical algorithm. The statistical algorithm used by handsets 501 and 502 may be the same as that used by base station 500, or it may be an algorithm that calculates the best available channels based on the location or movement of each handset, or simply another statistical algorithm that complements the algorithm used by base station 500, the various embodiments of the present invention are not limited to any particular statistical algorithms.

When base station 500 broadcasts intelligent list 504 to handsets 501 and 502, handsets 501 and 502 compare the entries on intelligent list 504 to the entries on their own lists, intelligent lists 503 and 505, respectively. When selecting the particular channel to use for communication with base station 500, the particular handset will choose the best available channel in the intersection between the two lists. For example, when handset 501 chooses its communication channel, it will select channel E because channel E is the highest available channel in the set intersection between intelligent lists 503 and 504. Similarly, handset 502 will choose channel I, because channel I is the highest available channel in the set intersection between intelligent lists 504 and 505.

It should be noted that the channel selected by the handsets may not always be the channel at the top of the handset's intelligent list. For example, if channel E and channel C swapped positions in intelligent list 504, handset 501 would select channel B, because it is the highest available channel in both intelligent lists 503 and 504.

The various illustrative logical blocks, modules, and circuits described in connection with the embodiment disclosed herein may be implemented or performed with, but not limited to, a general purpose processor, a digital signal processor (DSP), an application specific integrated circuit (ASIC), a memory device such as RAM, ROM, EPROM, or EEPROM, a field programmable gate array (FPGA) or other programmable logic device, discrete gate or transistor logic, discrete hardware components, and any combination thereof designed to perform the functions described herein.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
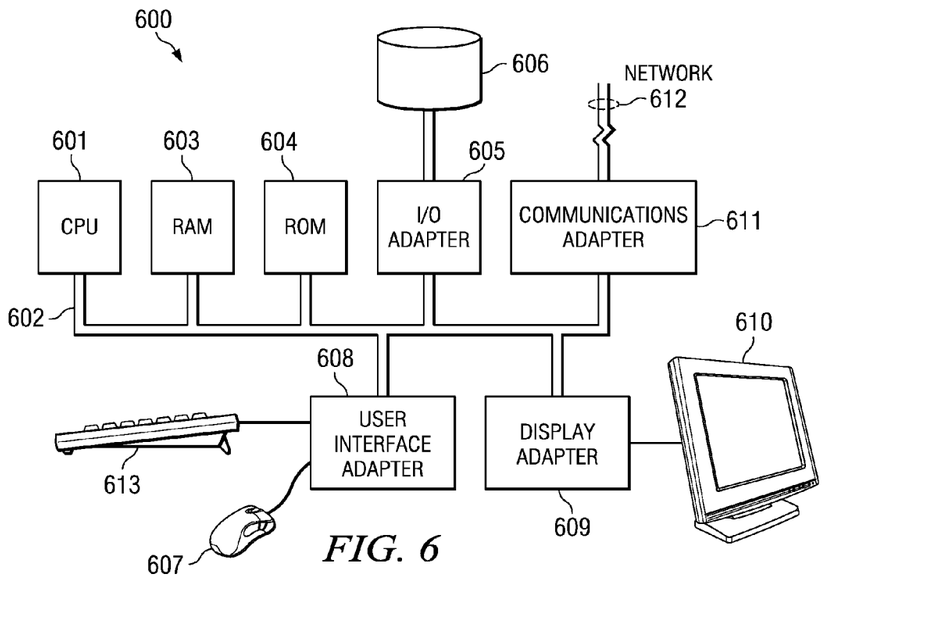
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for allocating a plurality of channels in a wireless network, said method comprising:

scanning unused channels of said plurality of channels in sectors of said wireless network, wherein said scanning is performed by a base station serving said sectors;

measuring a signal quality of said each scanned unused channel;

sorting said unused channels according to said measured signal quality;

ordering said sorted unused channels according to a statistical algorithm;

generating an ordered list of available channels according to results of said ordering;

broadcasting said ordered list of available channels to one or more access terminals (ATs) registered with said base station;

initiating new communication between said base station and said one or more ATs using a channel selected from said ordered list;

creating an AT ordered list of unused local channel of said plurality of channels surrounding one of said one or more ATs, the AT ordered list being sorted according to a measured local signal quality and ordered according to an AT statistical algorithm; and comparing said AT ordered list with said ordered list to determine a highest channel common to both of said lists, wherein said common highest channel is located in a top portion of said ordered list and said channel selected comprises said common highest channel.

2. The method of claim 1 further comprising:
receiving, at said base station, a transmission on a received channel;
comparing said received channel against said ordered list of available channels; and
determining said transmission is a call request when said received channel matches a first channel on said ordered list of available channels.

3. The method of claim 2 further comprising:
re-performing said scanning, said measuring, said sorting, said ordering, said generating, and said broadcasting responsive to initiating communication using said received channel.

4. The method of claim 2 further comprising:
periodically re-performing said scanning, said measuring, said sorting, said ordering, said generating, and said broadcasting responsive to initiating communication using said received channel.

5. The method of claim 1 wherein said measuring comprises one of:
measuring a signal-to-noise (S/N) ratio of said scanned unused channels; and
reading a received signal strength indicator (RSSI) related to said scanned unused channels.

6. The method of claim 1 further comprising:
dividing said ordered list according to a channel deployment rule.

7. The method of claim 6 wherein said channel deployment rule is set by administration signals of said wireless network and divides said ordered list between two or more bearer signals.

8. The method of claim 1 further comprising one of:
receiving said statistical algorithm from administration signals of said wireless network;
receiving a set of statistical algorithms from said administration signals, wherein one of said set is selected by said base station according to a sector condition; or
independently selecting said statistical algorithm by said base station according to said sector condition.

9. The method of claim 1 wherein said statistical algorithm comprises one of:
least recently used (LRU);
least frequently used (LFU); or
adaptive replacement.

10. The method of claim 1 further comprising:
receiving information indicating to page one of said one or more ATs;
accessing said ordered list to select a first available paging channel; and
transmitting said page to said one of said one or more ATs using said first available paging channel.

11. The method of claim 10 further comprising:
receiving, at said one of said one or more ATs, a transmission over a transmit channel;
comparing said transmit channel to said ordered list; and
recognizing said page when said transmit channel corresponds to said first available paging channel on said ordered list.

12. The method of claim 1, wherein:
creating the AT ordered list comprises:
scanning unused local channels of said plurality of channels in a location surrounding one of said one or more ATs, wherein said scanning is performed by said one of said one or more ATs,
measuring a local signal quality of said scanned unused local channels,
sorting said unused local channels according to said measured local signal quality, quality;
ordering said sorted unused local channels according to an AT statistical algorithm, and
generating an AT ordered list of available local channels according to results of said ordering; and
the method further comprises:
receiving said ordered list from said base station.

13. The method of claim 1 wherein said measuring includes:
measuring channel interference from a channel deployment pattern in neighboring sectors; and
measuring channel interference from an environmentally occurring signal source.

14. A wireless communication system comprising:
a base station controlling allocation of a plurality of channels to one or more access terminals (ATs) registered with said base station, said plurality of channels available to a plurality of sectors served by said base station;
an ordered list of unused channels of the plurality of channels created by said base station in said plurality of sectors, wherein the base station broadcasts the ordered list to the one or more ATs registered with the base station, and wherein said base station creates said ordered list based on:
unused channels in one of said plurality of sectors served by said base station;
a sorted signal quality of the unused channels in the one of said plurality of sectors; and
a statistical algorithm;
a local ordered list of unused channels created in consideration of:
one or more local channels of said unused channels of the plurality of channels in a location surrounding said one or more ATs,
a local signal quality of said one or more local channels, and
an AT statistical algorithm;
wherein said ordered list is stored by said base station and said one or more ATs registered with said base station and wherein communication between said base station and said one or more ATs occurs using a channel selected from said ordered list; and
wherein said local ordered list is compared against said ordered list stored by said one or more ATs registered with said base station and wherein said selected channel from a top portion of said ordered list comprises a highest ordered channel common to said local ordered list and said ordered list.

15. The wireless communication system of claim 14 wherein said signal quality comprises one or more of:
a signal-to-noise (S/N) ratio; and
a received signal strength indicator (RSSI).

16. The wireless communication system of claim 14 wherein said signal quality is influenced by one or more of:

a channel deployment pattern in neighboring one of said plurality of sectors; and an environmentally occurring signal source.

17. The wireless communication system of claim 14 wherein said base station creates said ordered list in further consideration of:

a channel deployment rule that divides said ordered list between two or more bearer signals.

18. The wireless communication system of claim 14, wherein the local ordered list of unused channels is created by said one or more ATs.

19. The wireless communication system of claim 14 wherein said statistical algorithm comprises one of:

least recently used (LRU);

least frequently used (LFU); or adaptive replacement.

* * * * *